United States Patent
Schleiden et al.

(10) Patent No.: US 9,149,752 B2
(45) Date of Patent: Oct. 6, 2015

(54) OIL MIST SEPARATOR FOR SEPARATING AEROSOL OIL FROM AN OIL-LADEN GAS

(71) Applicant: MANN+HUMMEL GMBH, Ludwigsburg (DE)

(72) Inventors: Thomas Schleiden, Oberstenfeld (DE); Marcel Holzwarth, Ludwigsburg (DE); Heinz Fuchs, Benningen (DE); Juergen Kosicki, Erligheim (DE)

(73) Assignee: MANN + HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/181,705

(22) Filed: Feb. 16, 2014

(65) Prior Publication Data

US 2014/0157737 A1     Jun. 12, 2014

Related U.S. Application Data

(63) Continuation of application No. PCT/EP2012/064198, filed on Jul. 19, 2012.

(30) Foreign Application Priority Data

Aug. 17, 2011   (DE) .......................... 10 2011 110 499

(51) Int. Cl.
*B01D 45/08* (2006.01)
*F01M 13/04* (2006.01)

(52) U.S. Cl.
CPC .............. *B01D 45/08* (2013.01); *F01M 13/04* (2013.01); *F01M 2013/0433* (2013.01)

(58) Field of Classification Search
CPC   B01D 45/08; F01M 13/04; F01M 2013/0433
USPC .................... 123/572, 573, 574, 41.86, 198 E
See application file for complete search history.

(56) References Cited

U.S. PATENT DOCUMENTS

| | | | |
|---|---|---|---|
| 4,744,958 A * | 5/1988 | Pircon | 422/606 |
| 7,799,109 B2 | 9/2010 | Dunsch et al. | |
| 2008/0155949 A1* | 7/2008 | Dunsch et al. | 55/456 |
| 2011/0179755 A1* | 7/2011 | Gruhler et al. | 55/320 |
| 2012/0132075 A1* | 5/2012 | Jarrier et al. | 95/268 |

FOREIGN PATENT DOCUMENTS

| | | |
|---|---|---|
| DE | 102008044857 A1 | 8/2010 |
| EP | 2336510 A1 | 6/2011 |
| FR | 2913054 A1 | 8/2008 |
| JP | H0583310 U | 11/1993 |
| JP | 2000045750 A | 2/2000 |
| JP | 2002106320 A | 4/2002 |

OTHER PUBLICATIONS

Search report of PCT/EP2012/064198, dated Oct. 2, 2012.

* cited by examiner

*Primary Examiner* — Dung H Bui
(74) *Attorney, Agent, or Firm* — James Hasselbeck

(57) ABSTRACT

An oil mist separator for separating aerosol oil from an oil-laden gas has an impactor. The impactor has a nozzle device with at least one nozzle for gas to be freed from oil, wherein the at least one nozzle has a streaming region. The impactor further has at least one deflector body having a separating region for the oil, wherein the separating region is positioned in the streaming region of the at least one nozzle. The separating region has a surface structure that is monolithically formed with the at least one deflector body. The surface structure has elevations and recesses arranged alternatingly in all directions transversely to a main streaming direction of the at least one nozzle.

7 Claims, 5 Drawing Sheets

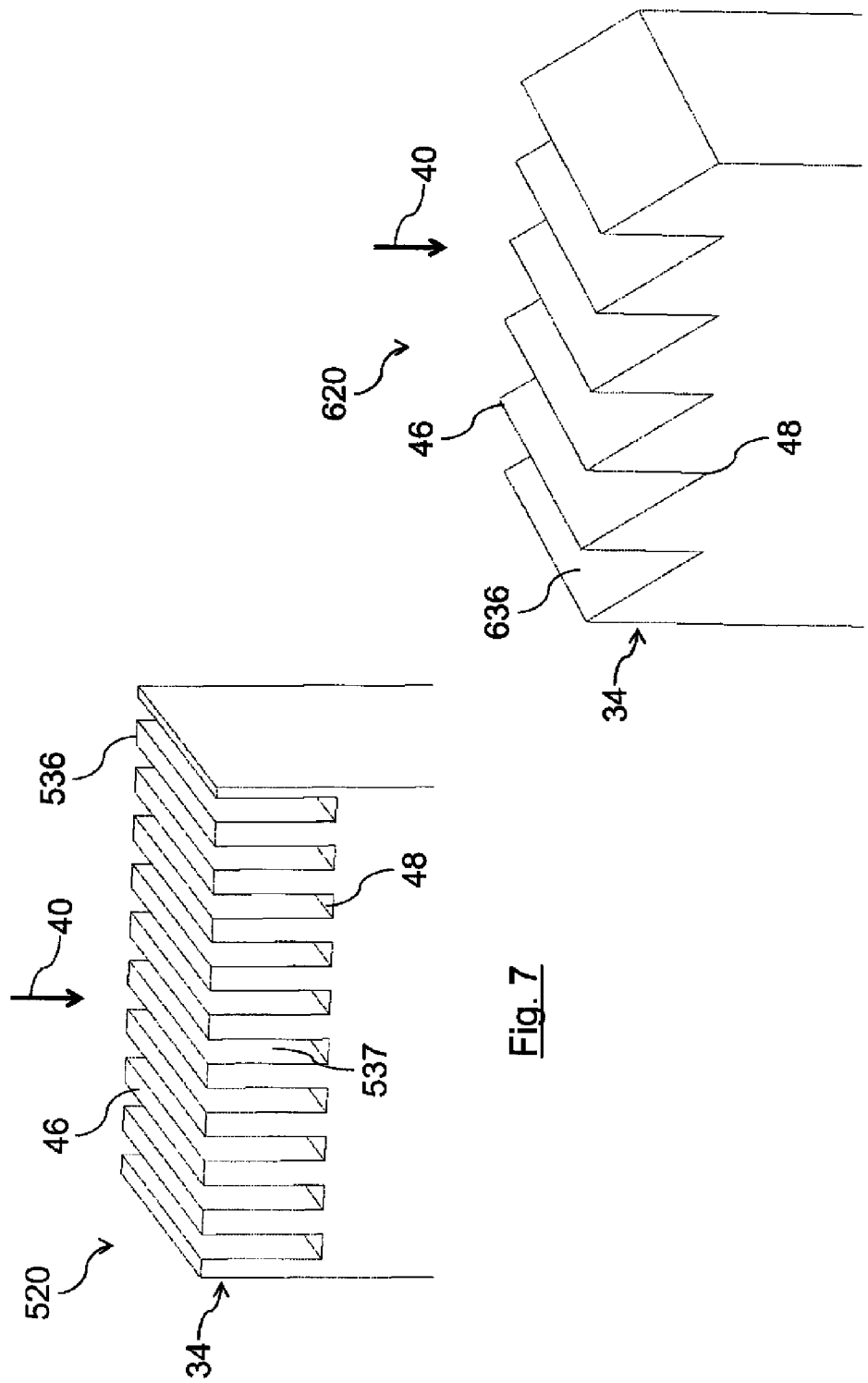

OIL MIST SEPARATOR FOR SEPARATING AEROSOL OIL FROM AN OIL-LADEN GAS

CROSS-REFERENCE TO RELATED APPLICATIONS

This application is a continuation application of international application No. PCT/EP2012/064198 having an international filing date of Jul. 19, 2012 and designating the United States of America, the international application claiming a priority date of Aug. 17, 2011, based on prior filed German patent application No. 10 2011 110 499.6, the entire contents of the aforesaid international application and the aforesaid German patent application being incorporated herein by reference.

BACKGROUND OF THE INVENTION

The invention concerns an oil mist separator for separating aerosol oil from an oil-laden gas, in particular blow-by gas, in particular of a crankcase venting device of an internal combustion engine, in particular of a motor vehicle. The oil mist separator comprises at least one impactor that comprises a nozzle device with at least one nozzle for the gas to be freed from oil and at least one deflector body having a separating region for the oil which region lies in a streaming region of the at least one nozzle.

DE 10 2009 024 701 A1 discloses an oil mist separator embodied as an impactor for a crankcase venting device. The oil mist separator has a nozzle device with at least one nozzle. A deflector wall which is positioned opposite the at least one nozzle is covered with a separator material. The separator material is a nonwoven, a weft-knit material or a warp-knit material.

The invention has the object to design an oil mist separator of the aforementioned kind in such a way that it is of a simple configuration and is easy to produce and moreover achieves improved separating efficiency.

SUMMARY OF THE INVENTION

In accordance with the present invention, this is achieved in that the separating region is realized with a surface structure that is connected integrally or monolithically with the deflector body and in that the surface structure comprises elevations and recesses which are arranged alternatingly in all directions transverse or crosswise to the main streaming direction of the at least one nozzle.

Within the impactor, the gas to be freed from oil mist flows through the at least one nozzle and is accelerated within the at least one nozzle in the main streaming direction. The oil mist separator may comprise at least the impactor or, as a whole, can be designed as an impactor. The main streaming direction is the direction of the main stream of the gas to be freed from oil mist as it exits from the at least one nozzle. The gas that is laden with the aerosol oil impacts in the streaming region of the at least one nozzle on the separating region of the deflector body. The streaming region of the at least one nozzle is the region where the gas to be freed from oil impacts directly. The gas is deflected upon impact and flows along the separating region to a gas outlet of the oil mist separator. The gas freed from oil can optionally be supplied to an air filter of the internal combustion engine. The oil particles impact on the surface of the separating region, are thereby separated from the gas, and sink, as a result of the force of gravity, along the separating region in downward direction to the bottom where they can be collected and removed from the oil mist separator. The collected oil can optionally be supplied to the oil sump of the internal combustion engine.

According to the invention, the deflector body itself is provided with a surface structure which forms the separating region. The elevations and recesses of the surface structure provide streaming obstacles which slow down the gas stream that is exiting from the at least one nozzle and, in this way, increase the separating efficiency. The gas flows across the deflector body between the elevations so that an improved oil separation is achieved.

Advantageously, the surface structure is designed such that the depth of the recesses and the expansion of the elevations across the surface can be of a similar magnitude as a spacing between elevations that are positioned next to each other.

In contrast to the oil mist separator known from the prior art, it is not required to attach a separate separator material on the deflector body. In this way, mounting expenditure and/or material expenditure can be reduced. Also, an integral or monolithic connection between the separating region and the deflector body is more stable and strong than a connection by subsequent attachment of a separate surface structure component. The separating region can moreover be produced together with the deflector body.

The elevations and recesses of the surface structure are distributed in all directions transversely or crosswise, in particular perpendicularly or at a slant, to the main streaming direction. An embodiment of the surface structure as a plurality of adjacently arranged structural bodies with their corresponding center line extending in the direction of the main streaming direction is particularly advantageous. The surface structure can be planar but it can also extend along a curved surface, in particular, a concave or convex surface.

In the streaming region that is acted on by the gas stream passing through the at least one nozzle, a plurality of elevations and recesses are arranged. Thus, several elevations and recesses are exposed to a gas stream to be freed from oil that is exiting from the at least one nozzle. In this way, the separating efficiency is improved. It is also possible to provide several nozzles. The nozzles can be arranged uniformly distributed in such a way that the exiting gas stream of each nozzle can impact on the separating region of the deflector. Alternatively, the nozzle openings can be provided with slot-shaped or oval passages or can be designed as a slotted hole. A cross-shaped opening, for example, in the form of two slotted holes that are superimposed can affect oil separation positively.

For realizing the elevations and recesses, it is also possible to have a fiber structure or thread structure that is connected monolithically with the deflector body. Alternatively, the elevations and recesses can be designed in a structure similar to hooks and loops of a hook-and-loop fastener. These structures can be attached to the deflector by an adhesive or by welding.

In an advantageous embodiment, the surface structure can be realized by injection molding technology on an injection-molded deflector body. The deflector body can be simply produced of plastic material, a metal or a different type of material that is suitable for injection molding or shaping according to an injection molding process or a shaping process. The surface structure can be produced according to injection molding technology by an injection molding method when producing the deflector body. Monolithic surface structures produced by injection molding are stably and fixedly joined with the deflector body. By means of an injection molding process it is also possible in a simple way to produce even complex shapes. Alternatively, the surface structure can also be realized monolithically on the deflector in a different way. In particular, the surface structure can be realized on the deflector body by a process that removes material, in particular by a cutting process or an etching process.

Advantageously, the elevations and recesses can be distributed uniformly across the separating region. In this way, across the entire separating region a uniform oil separation can be achieved. A uniform arrangement of elevations and recesses can moreover be realized in a simple way.

Moreover, the spacings or distances between elevations of the surface structure that are next to each other is advantageously maximally of the magnitude of an opening cross-section of the at least one nozzle. In this way, the streaming region of the at least one nozzle can be extending simply across a plurality of elevations and recesses. In this way, an improved oil separation can be achieved in comparison with streaming against a smooth separating surface. The main gas stream exiting from the at least one nozzle can be divided simply into a plurality of partial gas streams; this improves the separating efficiency.

In a further advantageous embodiment, on the side of the deflector body that is facing the at least one nozzle a plurality of structural bodies, in particular cones and/or truncated cones and/or pyramids and/or truncated pyramids and/or cylinders, can be arranged, wherein these structural bodies form at least partially the surface structure. The surface structure can be comprised of several identical structural bodies or a combination of different structural bodies. By means of the structural bodies defined flow obstacles can be predetermined. An optimal distribution of the gas stream along the separating region can be achieved. In this way, the separating efficiency can be further improved. The structural bodies can be predetermined in a defined way in regard to form and/or size and/or distribution. In particular, the structural bodies can be matched with regard to their type and/or arrangement to the size of the streaming region of the at least one nozzle, in particular the stream cross-section of the gas stream in the main streaming direction. In addition, or as an alternative, the structural bodies can be matched to the flow courses and/or flow rates existing within the oil mist separator. For optimizing the separating efficiency, the angles between the lateral surfaces or the circumferential surfaces and the base surfaces of the cones, truncated cones, pyramids, and truncated pyramids can be predetermined. The angles can be predetermined in particular as a function of the geometric configuration of the oil mist separator, the number of nozzles, the size of the nozzles, and/or the flow rates. Cones and truncated cones have the advantage that they enable an optimal diffusion of the impacting gas stream.

BRIEF DESCRIPTION OF THE DRAWING

Further advantages, features, and details of the invention can be taken from the following description in which embodiments of the invention will be explained in more detail with the aid of the drawing. A person of skill in the art will consider the features that are disclosed in combination in the drawing, the description, and the claims also expediently individually and combine them to other meaningful combinations.

FIG. 7 is an isometric detail view of a deflector wall according to a sixth embodiment with structural bodies in the form of webs which can be used in the oil mist separator of FIG. 1.

FIG. 8 is an isometric detail view of a deflector wall according to a seventh embodiment with sawtooth-shaped structural bodies which can be used in the oil separator of FIG. 1.

In the drawings, same components are identified with same reference characters.

DESCRIPTION OF THE PREFERRED EMBODIMENTS

Figure 1:
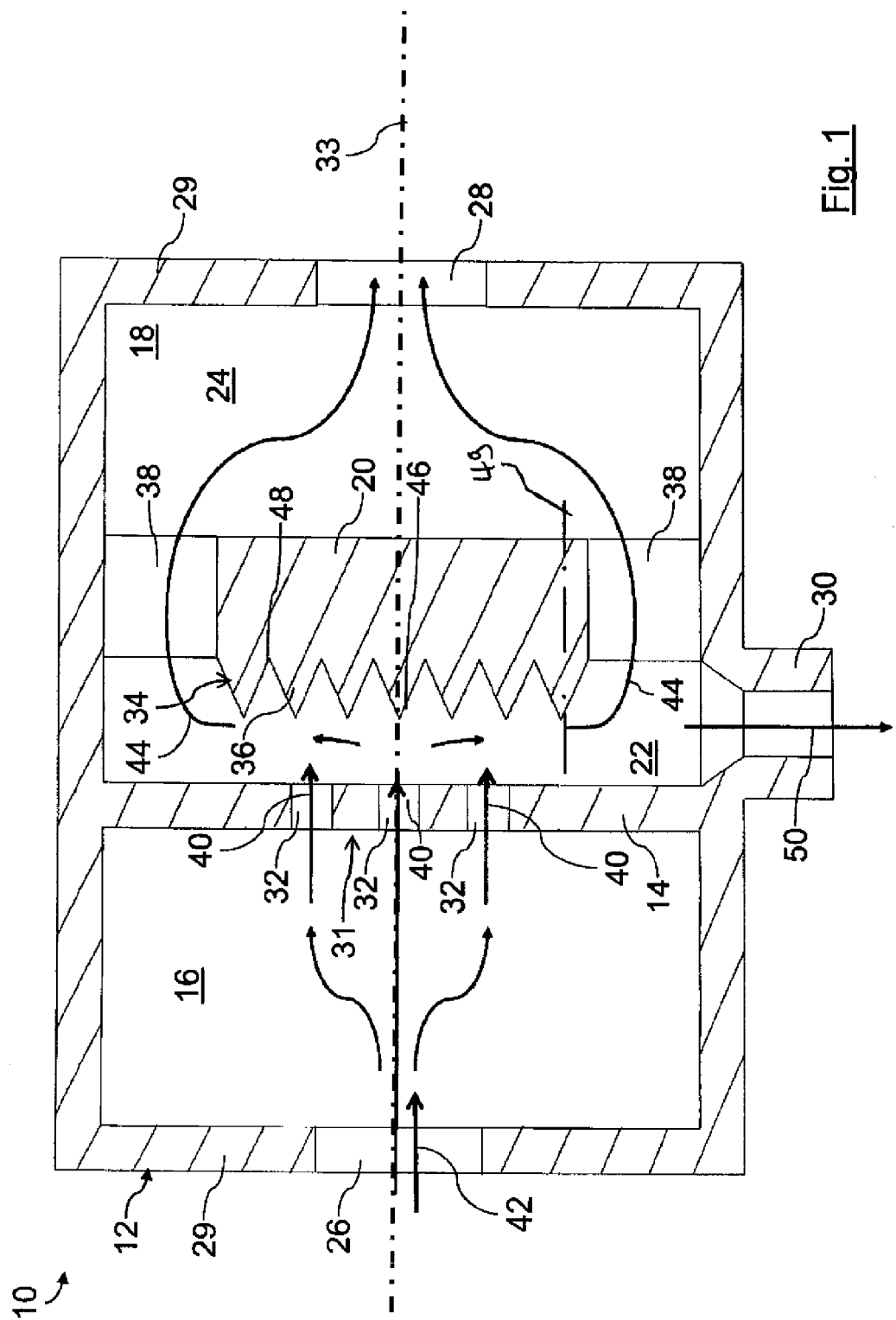
FIG. 1 shows a section of an oil mist separator of a device for crankcase venting of an internal combustion engine of a motor vehicle, comprising a deflector wall with pyramid-shaped structural bodies according to a first embodiment.

FIG. 1 shows a section view of an oil mist separator 10 embodied as an impactor of a device for crankcase venting of an internal combustion engine of a motor vehicle; details of the crankcase venting device are not illustrated. The oil mist separator 10 is arranged in a crankcase venting line of the internal combustion engine. By means of the crankcase venting line, blow-by gas is discharged from the crankcase in a way that is not of interest in the context of the present invention. With the oil mist separator 10 the aerosol oil which is contained in the blow-by gas is separated, collected, and returned by means of a return line, in a way not of interest in the context of the present invention, to an oil sump of the internal combustion engine.

The oil mist separator 10 comprises a housing 12 which is divided by means of a partition 14 into an inlet chamber 16 and an outlet chamber 18. The outlet chamber 18 is divided by means of a deflector wall 20, configured according to a first embodiment, into a separating region 22 and an outlet region 24. The deflector wall 20 and the partition wall 14 extends parallel to each other. The partition 14 and the deflector wall 20 extend approximately vertically in the normal mounted state of the oil separator 10, illustrated in FIG. 1.

An inlet 26 leads into the inlet chamber 16 and is connected by means of an inlet section of the crankcase venting line with an outlet of the crankcase. On the opposite side of the housing 12, an outlet 28 leads away from the outlet chamber 18 and is connected by means of an outlet section of the crankcase venting line with an inlet of an air filter, for example. End walls 29 of the housing 12 in which the inlet 26 and the outlet 28 are located extend parallel to the partition 14 and to the deflector wall 20. The end walls 29 extend vertically in the normal mounted state of the oil separator 10.

At the bottom of the housing 12 in FIG. 1, there is an oil drain socket 30 which connects the separating region 22 by means of a return line with the oil sump of the internal combustion engine.

Opposite the inlet 26, the partition 14 has a nozzle region 31 with a plurality of nozzles 32 which connect the inlet chamber 16 with the separating region 22. The nozzle region

31, the inlet 26, and the outlet 28 are coaxial to an axis 33. The axis 33 extends horizontally in the normal mounted state of the oil mist separator 10.

The side of the deflector wall 20 that is oppositely positioned relative to the openings of the nozzles 32 has a separating region 34. The separating region 34 projects radially relative to the axis 33 past the nozzle region 31. The separating region 34 is located within the streaming regions of all nozzles 32. The blow-by gas which is flowing out of the inlet chamber 16 through the nozzles 32 and into the separating region 22 flows against the separating region 34 within the respective streaming regions.

Figure 2:
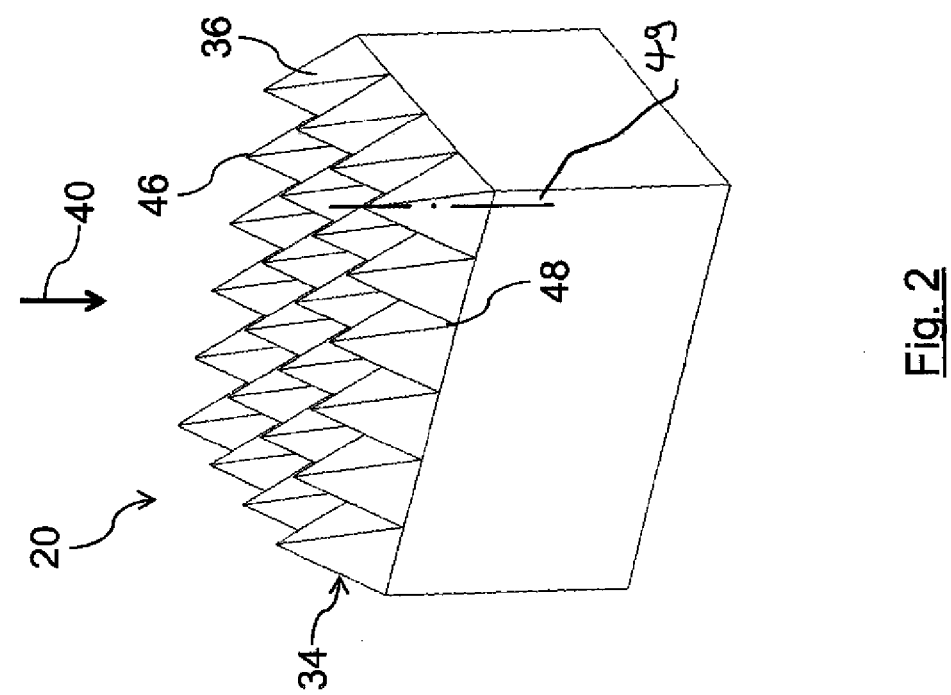
FIG. 2 shows an isometric detail view of the deflector wall of FIG. 1.

In the separating region 34 a deflector wall 20 is provided with a surface structure as illustrated in detail in FIG. 2. The surface structure is realized by a plurality of pyramids 36. The pyramids 36 with the center line 49 are uniformly distributed across the separating region 34. Distances between the tips 46 of neighboring pyramids 36, i.e, pyramids 36 that are next to each other, are approximately of the magnitude of the diameter of the openings of the nozzles 32. The tips 46 of the pyramids 36 point toward the partition 14. The pyramids 36 realize elevations formed by the tips 46 and recesses 48 located between the tips 46. The tips 46 and the recesses 48 are alternatingly arranged in all directions transversely to the main streaming directions of the nozzles 32, indicated in FIG. 1 by arrows 40. The main streaming directions 40 of the nozzles 32 extend in the direction of the axis 33, i.e., perpendicular to the partition 14 and the deflector wall 20.

The deflector wall 20 is produced of plastic material by an injection molding process wherein the pyramids 36 are formed monolithically on the surface of the deflector wall 20 by injection molding technology.

Outside of the separating region 34, the deflector wall 20 has several through openings 38 which connect the separating region 22 with the outlet region 24.

When the internal combustion engine is operating, the blow-by gas that is laden with aerosol oil particles flows from the crankcase through the inlet section of the crankcase venting line to the inlet 26 and reaches the inlet chamber 16 of the oil mist separator 10, as indicated by arrow 42. Here, the blow-by gas is distributed and flows toward the nozzles 32 that cause acceleration of the blow-by gas stream. The oil-laden blow-by gas flows in the main streaming direction 40 into the separating region 22 of the outlet chamber 18 and flows against the deflector wall 20. The blow-by gas flows about the tips 46 of the pyramids 36 within the recesses 48. The surface structure effects an improvement of the oil separating efficiency. The blow-by gas that has been separated from the oil is then deflected in the separating region 22, indicated by arrows 44, and flows through the through openings 38 into the outlet area 24. From here the blow-by gas that has been freed from oil flows through the outlet 28 and via the outlet section of the crankcase venting line to the air filter.

The aerosol oil droplets contained in the blow-by gas are separated in the separating region 34 on the surfaces of the pyramids 36. The separated oil droplets migrate due to the force of gravity in downward direction and reach the oil drain socket 30 from where, as indicated by arrow 50, they can be discharged from the housing 12 into the oil return line and from there into the oil sump of the internal combustion engine.

Figure 3:
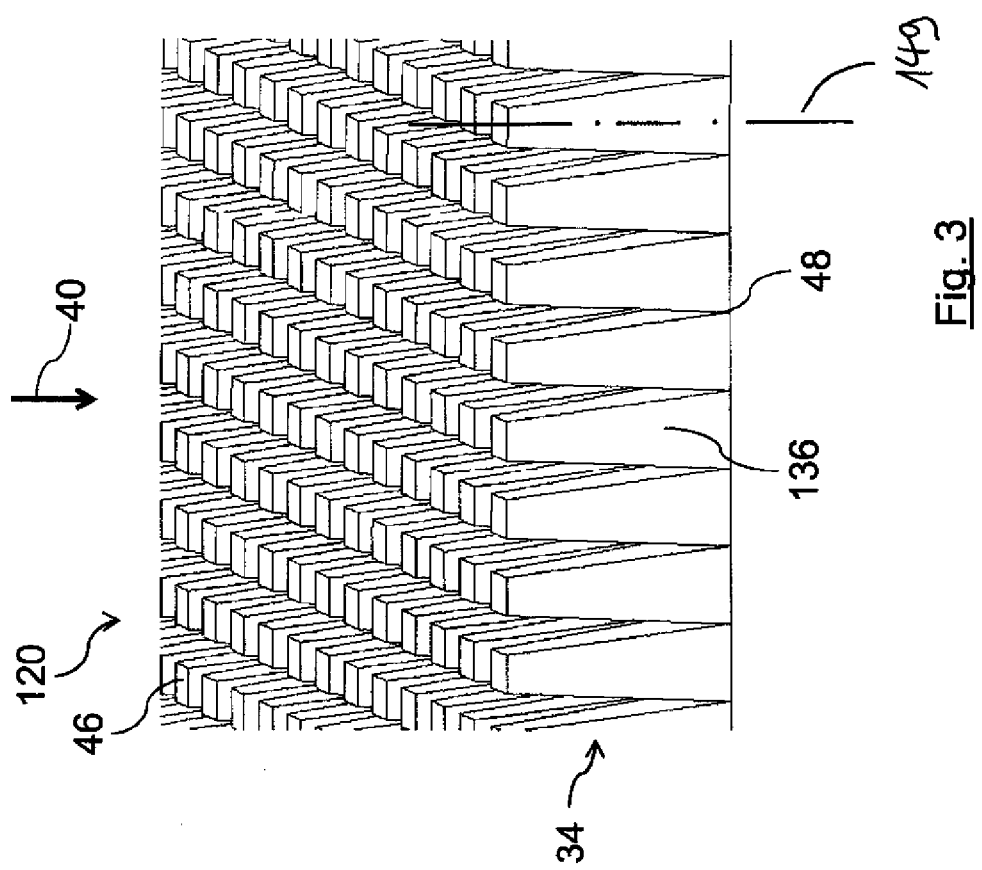
FIG. 3 shows an isometric detail view of a deflector wall according to a second embodiment that is similar to the deflector wall of FIGS. 1 and 2 but has structural bodies of a truncated pyramid shape.

In FIG. 3, a section of a deflector wall 120 according to a second embodiment is illustrated which is similar to the deflector wall 20 according to the first embodiment of FIGS. 1 and 2. In contrast to the first embodiment, in the second embodiment a plurality of truncated pyramids 136 with a centerline 149 are distributed uniformly within the separating region 34. In this embodiment, elevations 46 and recesses 48 are alternatingly realized also in all directions transverse to the main streaming direction 40.

Figure 4:
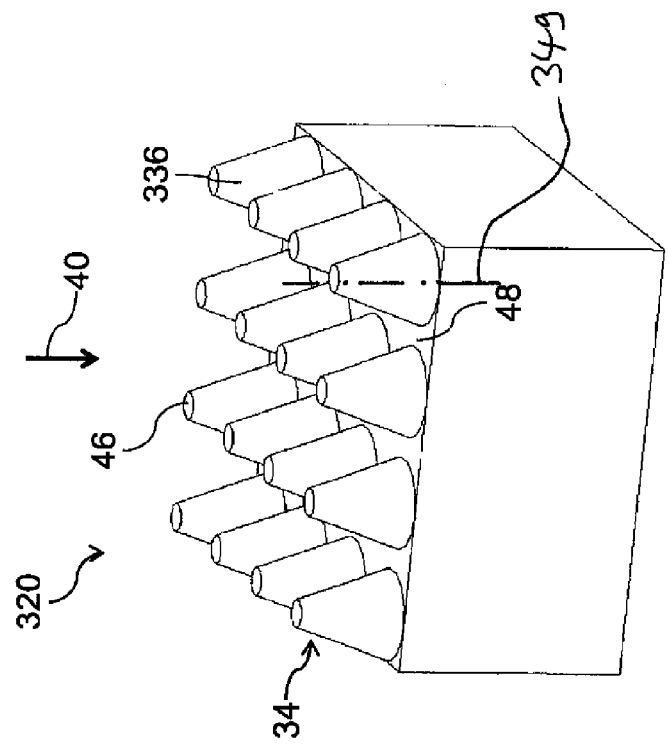
FIG. 4 is an isometric detail view of a deflector wall according to a third embodiment that is similar to the deflector walls of the FIGS. 1 through 3 but has conical structural bodies.

In a third embodiment of a deflector wall 220, illustrated in FIG. 4, in contrast to the first embodiment with the pyramids 36, a plurality of cones 236 with center line 249 are provided spaced apart from each other and uniformly distributed in the separating region 34.

Figure 5:
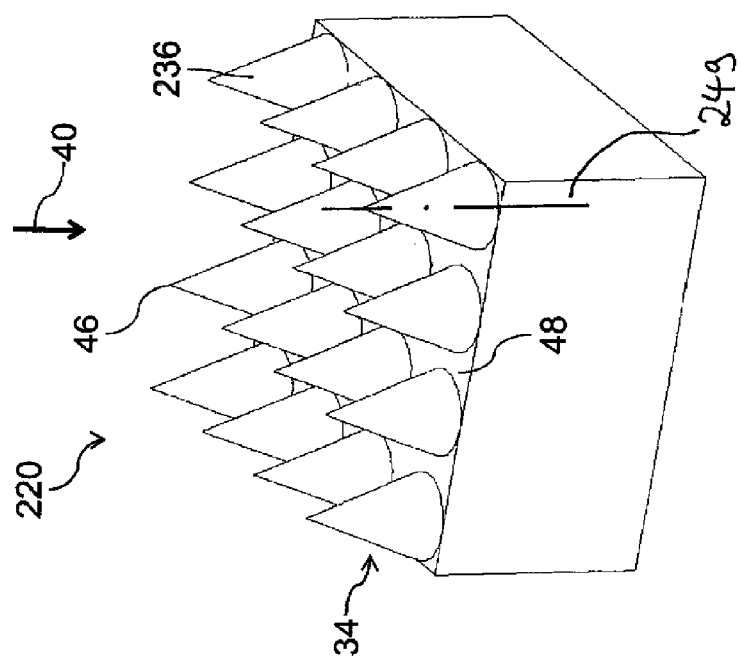
FIG. 5 is an isometric detail view of a deflector wall according to a fourth embodiment that is similar to the deflector walls of FIGS. 1 through 4 but has truncated cone-shaped structural bodies.

In a fourth embodiment of a deflector wall 320, illustrated in FIG. 5, in place of the pyramids 36 of the first embodiment, a plurality of truncated cones 336 with center line 349 are provided spaced apart from to each other and uniformly distributed in the separating region 34.

Figure 6:
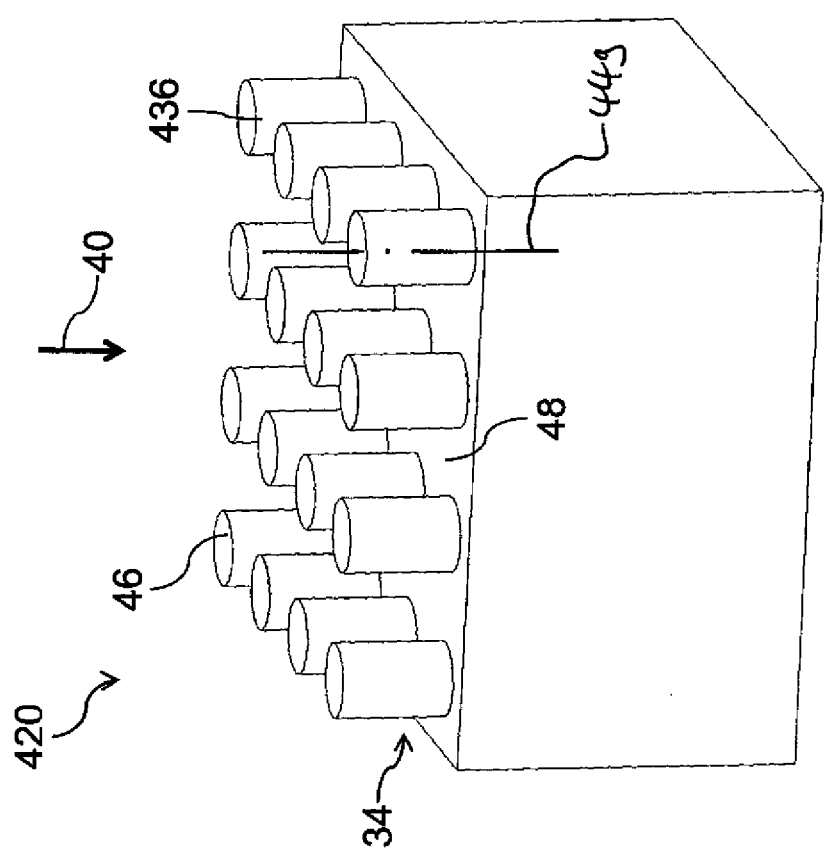
FIG. 6 is an isometric detail view of a deflector wall according to a fifth embodiment that is similar to the deflector walls of FIGS. 1 through 5 but has cylindrical structural bodies.

In a fifth embodiment of a deflector wall 420 illustrated in FIG. 6, in contrast to the first embodiment with the pyramids 36, a plurality of cylinders 436 with center line 449 are provided spaced apart and uniformly distributed within the separating region 34.

In a sixth embodiment of the deflector wall 520, in contrast to the first embodiment with the pyramids 36, a plurality of webs 536 are arranged parallel to each other at identical same spacing in the separating region 34. The spacing or distance between neighboring webs 536, i.e, webs 536 that are next to each other, is as large as the width of the webs 536 in this direction. The spacing between neighboring webs 536 is maximally within the magnitude of the cross-sections of the openings of the nozzles 32. The depth of recess grooves 537 between the webs 536 is significantly greater than the width of the webs 536 or their spacing relative to each other.

In FIG. 8, a seventh embodiment of a deflector wall 620 is illustrated in which, in contrast to the sixth embodiment of FIG. 7 with the webs 536, a plurality of sawtooth elements 636 at uniform spacing parallel to each other are provided. The spacing between the elevations 46 and the recesses 48 of the sawtooth elements 636 is greater than the spacing between neighboring elevations 46, i.e., elevations 46 that are next to each other. The spacing between neighboring elevations 46 is maximally within the magnitude of the cross-sections of the openings of the nozzles 32.

In all of the above described embodiments of an oil mist separator 10 and a deflector wall 20, 120, 220, 320, 420, 520, 620, the modifications set firth in the following are possible inter alia.

The invention is not limited to an oil mist separator 10 of a crankcase venting device of an internal combustion engine. Instead, it can also be used in other types of oil mist separators. It is moreover not limited to the use in motor vehicles. Instead, it can be used in many different kinds of internal combustion engines, for example, industrial motors.

The spacings between neighboring elevations 46 can also be smaller than the diameter of the openings of the nozzles 32.

In place of the cylindrical nozzles 32 it is also possible to have other nozzles that are formed differently, for example, are conically shaped or have other flow contours.

The pyramids 36, truncated pyramids 136, cones 236, truncated cones 336, cylinders 436, webs 536, and sawtooth elements 636 can be distributed non-uniformly across the separating region 34 instead of being distributed uniformly as shown in the drawings.

The surface structure of the separating region 34, formed by the pyramids 36, truncated pyramids 136, cones 236, truncated cones 336, cylinders 436, webs 536, and sawtooth elements 636 can also be realized by other methods than injection molding on the deflector wall 20, 120, 220, 320, 420, 520, 620. For example, the surface structure can be realized integrally or monolithically with the deflector wall 20, 120, 220,

320, 420, 520, 620 by means of a method that removes material, for example, a cutting method or an etching method.

In place of the deflector walls 20, 120, 220, 320, 420, 520, 620, it is also possible to have a different type of deflector body, for example, a concave or convex body can be provided.

In place of the pyramids 36, truncated pyramids 136, cones 236, truncated cones 336, cylinders 436, webs 536, and sawtooth elements 636, the surface structure of the separating region 34 can also be realized in a different way, in particular by different structural bodies, for example, a fiber structure or thread structure that is connected integrally or monolithically with the deflector body.

While specific embodiments of the invention have been shown and described in detail to illustrate the inventive principles, it will be understood that the invention may be embodied otherwise without departing from such principles.

What is claimed is:

1. An oil mist separator for separating aerosol oil from an oil-laden gas, the oil mist separator comprising:
    an impactor;
    the impactor comprising a nozzle device with at least one nozzle for gas to be freed from oil, wherein the at least one nozzle has a streaming region;
    the impactor further comprising at least one deflector body having a separating region for the oil, wherein the separating region is positioned in the streaming region of the at least one nozzle;
    wherein the separating region has a surface structure that is monolithically formed with the at least one deflector body;
    wherein the surface structure comprises elevations and recesses arranged alternatingly in all directions transversely to a main streaming direction of the at least one nozzle;
    wherein the surface structure has a series adjacently arranged projecting structural bodies, each having a corresponding center line extending in its direction of projection;
    wherein the projecting structural bodies are arranged on the surface structure in spaced apart rows and columns forming spaced apart rows and columns of elevations, the rows aligned in a first direction traverse to a main streaming direction of the at least one nozzle, the columns aligned on a second direction traverse to the main streaming direction of the at least one nozzle and also traverse to the first direction;
    wherein the corresponding center line extending in the direction of projection of the projecting structural bodies is aligned with the main streaming direction of the at least one nozzle;
    wherein the rows and columns of projecting structural bodies form a first set of spaced recesses elongated along the first direction and a second set of spaced recessed elongated along the second direction;
    wherein distances between corresponding center lines of adjacent structural bodies on each row and column is less than or equal to a diameter of a nozzle opening of the at least one nozzle.

2. The oil mist separator according to claim 1, wherein the at least one deflector body and the surface structure are injection-molded together.

3. The oil mist separator according to claim 1, wherein the elevations and recesses are distributed uniformly across the separating region.

4. The oil mist separator according to claim 1, wherein on a side of the at least one deflector body facing the at least one nozzle a plurality of structural bodies are arranged that at least partially form the surface structure.

5. The oil mist separator according to claim 4, wherein the structural bodies are selected from the group consisting of cones, truncated cones, pyramids, truncated pyramids, and cylinders.

6. The oil mist separator according to claim 1, wherein the surface structure is comprised of a plurality of structural bodies that are arranged next to each other and each have a center line extending in a direction of the main streaming direction of the at least one nozzle.

7. The oil mist separator according to claim 1, wherein the at least one nozzle has an opening that is slot-shaped or oval or is a slotted hole.

\* \* \* \* \*